United States Patent Office 2,876,115
Patented Mar. 3, 1959

2,876,115

MEAT PROCESSING AND COMPOSITION THEREFOR

Felix Epstein, Forest Hills, N. Y., assignor to First Spice Manufacturing Corp., New York, N. Y., a corporation of New York No Drawing. Application February 12, 1954
Serial No. 410,048

10 Claims. (Cl. 99—222)

This invention relates to improvements in the preparation of meats. In particular it is directed to improvements especially suitable for the preparation of meat products such as frankfurters, bolognas, loaves, luncheon meats, sausage products, cured and comminuted meats.

In the manufacture of sausage it had been konw for many years that there was nothing which could bind, absorb and hold moisture and fat as well as "hot bullmeat." In order, therefore, to achieve the fullest value from the meat cells, oldtime sausage makers strove to process bullmeat before the cells became cold and the meat underwent changes. By such procedure the sausage maker was able to utilize to the optimum the albumen and hemoglobin present in the meats. By effectuating greater hydration of the albumen he was able to achieve desired plumpness and texture of his products. In the freeing of the hemoglobin from the red blood cells the oldtime sausage maker was able to utilize the coloring properties to the maximum, thereby enhancing the color of the product.

Even before the silent cutter became available to the industry, skilled sausage makers attempted to squeeze out albumen and hemoglobin from all of the meat cells by hand chopping and the use of a "quetsche," a rolling mill. However, such methods were crude. When the silent cutter became available, the meat cells could be sliced more effectively but even then the blades of the silent cutter could not fully open all of the vast number of cells so as to release the albumen and hemoglobin contained therein to achieve the fullest advantages thereof.

The art has, therefore, sought for means whereby meats could be processed, from carcasses that had undergone rigor mortis, to produce products comparable with those that had been attainable when the processing was carried out on hot bullmeat.

Accordingly, it is one of the principal objects of this invention to provide means whereby the desired plumpness of meat products may be achieved.

Another object of this invention is to provide means whereby improved texture may be attained in an all-meat product.

A further object of this invention is to provide means whereby the sausage manufacturer is able to produce juicier products which retain such juiciness for prolonged periods of time.

Another object of this invention is to provide means whereby shrinkage during the course of meat processing is markedly reduced.

A still further object of this invention is to provide means whereby meat products may be produced which are characterized by improved color and color stability.

A still further object of this invention is to provide means whereby meat products can be cured more speedily thus enabling the processor to reduce the smoking time.

A further object of this invention is to provide means for improving the homogenization of fat, lean meat, and water to produce a meat product of desired texture.

A still further object of this invention is to provide means for reducing the rendering out of fat contained in meat products during the smoking and curing process.

A further object of this invention is to provide means for reducing the formation of gel pockets in meat products.

An even further object of this invention is to provide means for reducing slime and mold formation, arising from improved retention of moisture within the meat product.

An additional object of this invention is to provide means for reducing the loss of moisture during storage with resultant reduction in the shrinkage.

An even further object of this invention is to provide means that allow for higher initial smoking temperature without danger of fat separation.

A still further object of this invention is to provide means which enable the meat processor to chop the meat more finely and longer without getting "short" meats.

In its fundamental aspects the objects of this invention, as stated above, as well as other objects which will become apparent from the more detailed description of the invention, are achieved by the employment of a composition, consisting principally of a mixture of tetrasodium pyrophosphate and tetrapotassium pyrophosphate and disodium-phosphate containing a small amount of one or more polyphosphates.

It would appear that the mechanism of the processing arises from the following considerations: after slaughtering, a physico-chemical change in the calcium level results in a hardening of the animal cell walls. That hardening appears to prevent the maximum utilization of the properties of albumen and hemoglobin, by preventing the full release of the albumen and hemoglobin. By incorporating the composition of this invention mentioned above, there results a softening of the cell membrane as a consequence of which it becomes more permeable, thereby allowing moisture to enter. The moisture thus entering the cell wall (an absorption and swelling process) allows for improved utilization of the albumen for better fat binding and the hemoglobin for better color development with consequent improvement both in the product and the steps leading to the ultimate production thereof.

In the manufacture of products employing the composition of this invention, it has been found suitable to add the composition, in dry form, in the silent cutter after all other ingredients have been added, or into the lean meat emulsion before the fat is added.

Among the advantages of carrying out producton of meat products in accordance with this invention are: that the initial smoking house temperature can be about 20° F. higher than normal with faster color development resulting in marked reduction in smoking time and shrinkage without danger of fat separation.

Another advantage in manufacturing meat products in accordance with this invention is that a small amount of the novel composition is used. Such amount is of the order of about 4 ounces per hundred pounds of finished product. The resultant softness of the product reduces the friction between the meat and the knives thereby lessening the possibility of overheating. The meats, accordingly, can be chopped longer in order to produce finer, smoother products. The danger of smearing, overheating, and getting "short" meats is drastically reduced.

Another advantage of the composition of this invention is that it may be employed as an ingredient of curing and pumping pickles. The addition of about one ounce of the composition to one gallon of brine provides a material that results in markedly improved cured products.

It is believed that the action of the composition of this invention which results in the aforementioned improvements arises from an ionic exchange of the insoluble calcium ion by the combination of the soluble sodium and potassium ions. That action results in the softening of the cell wall so as to allow for increasing osmosis.

It is also to be noted that the composition in accordance with this invention provides means for adjusting the pH of the meats to such a point where the nitrite is able to work more rapidly and satisfactorily.

The following is a composition in accordance with the instant invention:

| | Parts by weight |
|---|---|
| Tetrasodium pyrophosphate | 100 |
| Tetrapotassium pyrophosphate | 80 |
| Disodium phosphate | 100 |
| Sodium tripolyphosphate | 20 |
| Citric acid | 15 |
| Sodium alginate | 7½ |

To manufacture frankfurters in accordance with this invention, a batch of 48 pounds of beef is ground in a conventional meat grinder using a fine plate. The meat thus ground is introduced into the silent cutter. Then 2 pounds of salt, 6 ounces of curing salts, and 8 ounces of seasoning are added thereto. While the silent cutter is operating, there are slowly incorporated in the batch, 18 pounds of ice. When nearly all of the ice has been incorporated, 4 ounces of the above described composition are introduced, and the chopping is continued until the temperature reaches 48° F. Then 32 pounds of pork trimmings which were coarse ground in a meat grinder using a coarse plate, are introduced into the silent cutter, and the same allowed to run so as to achieve a fine chopping until the temperature of the batch reaches 58°–60° F. When the batch achieves such temperature, the mixture is taken out and stuffed into casings and sent to the smokehouse, the initial temperature of the smokehouse being 160° F. (about 20° higher than normal). The smoking is continued for 45 minutes at a temperature of 160° F.; then the temperature is raised to 175° F. and held for 30 minutes; after which the product is finished at a temperature of 185° F. for a period of 15 minutes.

For curing and pumping pickles, one ounce of the above composition may be added to one gallon of brine which may be used in accordance with customary procedures resulting in juicier and better colored products.

In the place of the citric acid employed in the formulation of the foregoing composition, there may be used any appropriate food acidulant, as for example, tartaric acid or other suitable food acids. In the place of the sodium alginate there may be used carboxy methyl cellulose, or potassium polymetaphosphate of high molecular weight (approximately 8,000) or other suitable thickening agents.

It will be understood that the proportions of the ingredients of the aforesaid composition may be varied from the particular formulation set forth above. By simple tests, readily carried out, it is easy to adjust the proportions of those ingredients within the spirit and scope and advantages of this invention.

Accordingly, the foregoing description of the invention is merely illustrative of the principles thereof; and, therefore, the appended claims are to be construed as defining the invention within the full spirit and scope thereof.

I claim:

1. A composition for improving the characteristics of processed meats comprising:

| | Approximate parts by weight |
|---|---|
| Tetrasodium pyrophosphate | 100 |
| Tetrapotassium pyrophosphate | 80 |
| Disodium phosphate | 100 |
| Sodium tripolyphosphate | 20 |

2. A composition for improving the characteristics of processed meats comprising:

| | Approximate parts by weight |
|---|---|
| Tetrasodium pyrophosphate | 100 |
| Tetrapotassium pyrophosphate | 80 |
| Disodium phosphate | 100 |
| Sodium tripolyphosphate | 20 |
| Citric acid | 15 |
| Sodium alginate | 7½ |

3. A method of processing meats which comprises treating the meats with a brine containing a composition in accordance with claim 1.

4. A method of preparing a meat product which comprises comminuting meat and blending therewith during the comminution, a composition in accordance with claim 1.

5. A method of processing meats which comprises treating the meats with a brine containing a composition in accordance with claim 2.

6. A method of preparing a meat product which comprises comminuting meat and blending therewith during the comminution, a composition in accordance with claim 2.

7. A processed meat product comprising meat and a composition in accordance with claim 1.

8. A homogenized meat product comprising comminuted meat homogenized with a composition in accordance with claim 1.

9. A processed meat product comprising meat and a composition in accordance with claim 2.

10. A homogenized meat product comprising comminuted meat homogenized with a composition in accordance with claim 2.

References Cited in the file of this patent

UNITED STATES PATENTS

| 2,145,417 | Hall | Jan. 31, 1939 |
| 2,513,094 | Hall | June 27, 1950 |
| 2,735,776 | Bickel | Feb. 21, 1956 |

FOREIGN PATENTS

| 696,617 | Great Britain | Sept. 2, 1953 |